(12) United States Patent
Sakai et al.

(10) Patent No.: US 6,426,784 B1
(45) Date of Patent: Jul. 30, 2002

(54) LIQUID CRYSTAL DISPLAY AND METHOD FOR ASSEMBLING THE SAME

(75) Inventors: Seiji Sakai; Tomohisa Tajiri; Takuya Kuroki, all of Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 29 days.

(21) Appl. No.: 09/624,599

(22) Filed: Jul. 25, 2000

(30) Foreign Application Priority Data

Aug. 4, 1999 (JP) .......................................... 11-221458
Jul. 10, 2000 (JP) ....................................... 2000-207982

(51) Int. Cl.$^7$ ......................................... G02F 1/1333
(52) U.S. Cl. ....................................................... 349/58
(58) Field of Search ........................... 349/58; 345/156; 348/794, 836

(56) References Cited

U.S. PATENT DOCUMENTS

| 4,950,072 | A | * | 8/1990 | Honda ......................... 353/122 |
| 5,166,815 | A | * | 11/1992 | Elderfield ..................... 359/49 |
| 5,805,125 | A | * | 9/1998 | Suganuma et al. ............ 345/87 |
| 5,889,623 | A | * | 3/1999 | Ueda et al. .................. 359/819 |
| 6,128,184 | A | * | 10/2000 | Ito et al. ...................... 361/681 |
| 6,247,768 | B1 | * | 6/2001 | Yamaguchi ............... 312/223.2 |

FOREIGN PATENT DOCUMENTS

| JP | 405045649 A | * | 2/1993 |
| JP | 405165018 A | * | 6/1993 |
| JP | 411316414 A | * | 11/1999 |

* cited by examiner

Primary Examiner—William L. Sikes
Assistant Examiner—Hoan Nguyen
(74) Attorney, Agent, or Firm—McDermott, Will & Emery

(57) ABSTRACT

The invention provides a liquid crystal display superior in mechanical strength, which is capable of enlarging the screen and making the frame narrow.

The liquid crystal display is provided with liquid crystal display module positioning parts 9 having positioning ribs 8 located on both side portions of an upper case 1 and positioning holes 9a, in which the positioning ribs 8 are inserted, located on both side portions of a liquid crystal display module 3. As a result, in assembling the liquid crystal display in which the liquid crystal display module 3 is stored in the upper case 1 made of a resin material and a lower case 2 made of a metal material such as magnesium alloy of high rigidity, the liquid crystal display module 3 can be arranged on the lower case 2 at a position, which is shifted from a predetermined position toward a lower side portion by a distance B required for inserting a claw 7 at an upper side portion of the upper case 1 into a groove 2a of the lower case 2, and the claw 7 can be fitted into the groove 2a, whereby tapered portions 8a at the ends of the positioning ribs 8 can be brought into contact with end faces of the positioning holes 9a, and the liquid crystal display module 3 can be moved to a predetermined position while pushing up the liquid crystal display module 3 toward the upper side portion through the contact portions.

15 Claims, 4 Drawing Sheets

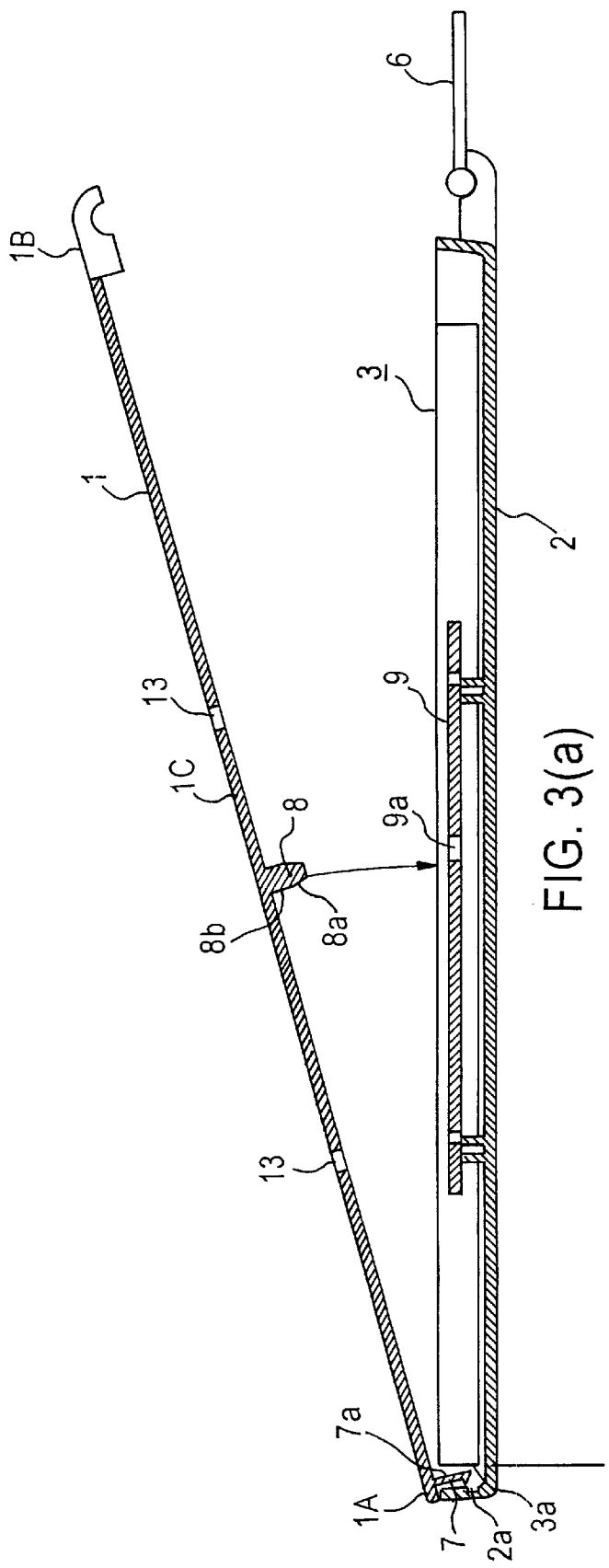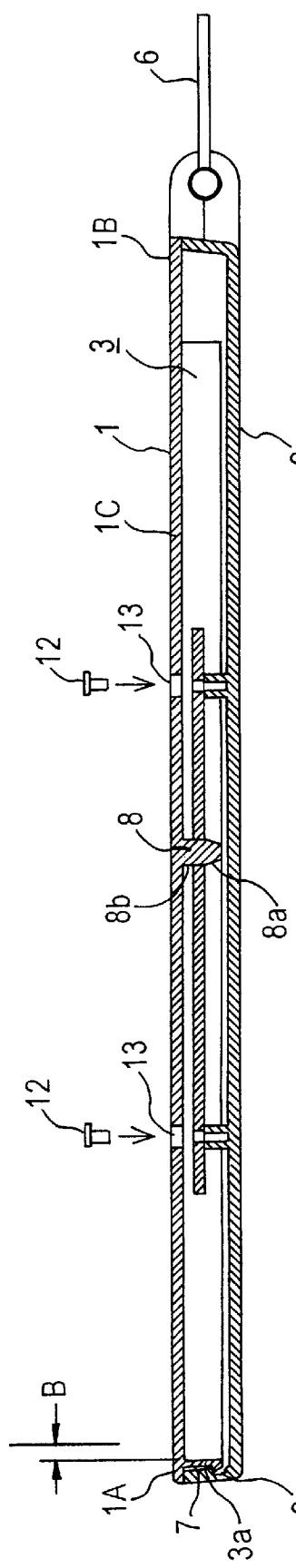
FIG. 3(a)
FIG. 3(b)

LIQUID CRYSTAL DISPLAY AND METHOD FOR ASSEMBLING THE SAME

BACKGROUND OF THE INVENTION

1. Industrial field

The present invention relates to a liquid crystal display for a notebook-type personal computer and a method for assembling the same.

2. Prior art

FIG. 4 is a partially sectional view showing an upper side portion of a conventional liquid crystal display for a notebook-type personal computer. In the drawing, reference numeral 3 is a liquid crystal display module in which a back light panel is combined with a liquid crystal display panel including a liquid crystal plate integrated with a driving circuit substrate. Numeral 14 is an upper case having a display opening portion, and in which upper side portion is provided with a claw which is formed by bending. Numeral 15 is a lower case having a groove 15a in which a claw 16 is inserted and which stores the liquid crystal display module 3 in cooperation with the upper case 14. The letter A in the drawing shows a space required for inserting the claw 16 into the groove 15a when the liquid crystal display is assembled. In this manner, the conventional liquid crystal display for a notebook-type personal computer is provided with a claw escaping space A for inserting the claw 16 into the lower case 15 when the liquid crystal display module 3 is stored into the upper case 14 and the lowercase 15.

On the other hand, in order to make the frame of the liquid crystal display narrow, it is desirable to minimize the space A for inserting the claw 16. Therefore, a method has been proposed in which the lower case 15 is formed with a resin or the like having a high elastic modulus and the lower case 15 is deformed outwardly and fitted with the upper case 14 when the claw 16 is inserted. There is proposed another method to cope with the case where there is no space for inserting the head of the claw 16. In this method, after shifting the liquid crystal display module 3 downward and fitting the upper side of the upper case 14 with the lower case 15, the liquid crystal display module 3 is moved from outside to a predetermined position using a jig or the like.

In recent years, under the background that the liquid crystal display for a notebook-type personal computer has become thinner, mechanical strength of the liquid crystal display tends to decrease accordingly. Moreover, a main body (not shown in the drawing) including an electronic controller and the liquid crystal display are connected through a hinge having a torque. As the screen has become larger, a distance between the point of application and the center of rotation increases when the display is opened and closed, and therefore a larger bending moment comes to act on the liquid crystal display portion.

While the screen of the liquid crystal display panel has become larger, size of the main body depending on size of the keyboard is almost fixed. For design reasons, it is necessary that the configurations of the main body and the liquid crystal display in a plane are equal in size, and consequently the frame of the liquid crystal display is required to be narrower. As a result, it is getting more difficult to provide the space A for inserting the fitting claw 16 like in the conventional liquid crystal display shown in FIG. 4 because of increase in the distance between the end face of the display plane and the external configuration.

As the liquid crystal display becomes thinner, there is a tendency to use a metal material or the like of high rigidity for the lower case 15 in order to maintain the mechanical strength of the liquid crystal display. In general, however, a metal material has a high elastic modulus, and it is difficult to deform the lower case 15 outwardly in order to fit the lower case 15 with the upper case 14 when the claw 16 is inserted. Moreover, the assembling method in which the position of the liquid crystal display module 3 is adjusted using a jig or the like has problems such as insufficient productivity, possibility of harming the liquid crystal display module 3 and other parts.

SUMMARY OF THE INVENTION

The present invention was, made to solve the above-discussed problems and has an object of providing a highly reliable liquid crystal display superior in mechanical strength and capable of enlarging the screen while making the frame narrow. The invention also provides a method for assembling such a liquid crystal display.

A liquid crystal display according to the invention comprises:

a liquid crystal display module in which a back light panel is combined with a liquid crystal display panel including a liquid crystal plate which is one with a driving circuit substrate;

an upper case which has an upper side portion and a lower side portion facing each other and a pair of side portions provided between the upper and lower side portions, and forms a display opening portion with the upper side portion, lower side portion, and pair of side portions;

a claw provided on the upper side portion of the upper case;

a lower case which has a groove in which the claw fits and stores the liquid crystal display module with the upper case; and liquid crystal display module positioning projections each being provided on each of two side portions of the upper case and including a tapered portion which is formed to be thinner toward the end and a straight portion serving as a base portion; and wherein both side portions of the liquid crystal display module are provided with liquid crystal display module positioning holes in which the positioning projections are inserted.

It is preferable that the liquid crystal display module positioning holes are directly formed on both side portions of the liquid crystal display module.

It is preferable that the liquid crystal display module positioning holes are formed on positioning parts fixed to the liquid crystal display module.

A liquid crystal display according to the invention comprises:

a liquid crystal display module in which a back light panel is combined with a liquid crystal display panel including a liquid crystal plate which is one with a driving circuit substrate;

an upper case which has an upper side portion and a lower side portion facing each other and a pair of side portions provided between the upper and lower side portions, and forms a display opening portion with the upper side portion, lower side portion, and pair of side portions;

a claw provided on the upper side portion of the upper case;

a lower case which has a groove in which the claw fits and stores the liquid crystal display module with the upper case; and liquid crystal display module positioning projections each being provided on each of two side portions of the upper case and including a tapered portion which is formed to be thinner toward the end and a straight portion serving as a base portion; and wherein both side portions of the upper case are provided with liquid crystal display module positioning holes in which the positioning projections are inserted.

It is preferable that the liquid crystal display module positioning projections are formed on both side portions of the mentioned liquid crystal display module.

It is preferable that the liquid crystal display module positioning projections are formed on positioning parts fixed on the mentioned liquid crystal display module.

It is preferable that the lower case is made of a metal material such as magnesium alloy of high rigidity.

A method for assembling a liquid crystal display according to the invention is a method for assembling a liquid crystal display which possesses a liquid crystal display module in which a back light panel is combined with a liquid crystal display panel including a liquid crystal plate integrated with a driving circuit substrate, an upper case which has an upper side portion and a lower side portion facing each other and a pair of side portions located between the upper and lower side portions and forms a display opening portion with the upper side portion, lower side portion, and pair of side portions, a claw located on the upper side portion of the upper case, and a lower case which has a groove in which the claw fits, and in which the liquid crystal display module is stored in the upper case and the lower case, wherein the method includes the steps of:

placing the liquid crystal display module on the lower case at a position, which is shifted from a predetermined position toward the lower side portion by a distance required for inserting the claw located at the upper side portion of the upper case into the groove of the lower case;

fitting the claw located at the upper side portion of the upper case into the groove on the lower case;

turning the upper case toward the lower case with the claw as a center;

fitting both side portions and the lower side portion of the upper case with those of the lower case;

bringing tapered portions located at the ends of liquid crystal display module positioning projections provided on both side portions of the upper case into contact with end faces of liquid crystal display module positioning holes provided on both side portions of the liquid crystal display module;

moving the liquid crystal display module toward a predetermined position while pushing up the liquid crystal display module toward the upper side portion through the contact portions;

inserting the positioning projections into the positioning holes; and conducting a final positioning of the liquid crystal display module making use of straight portions serving as a base of the positioning projections.

It is also preferable that the method includes a step of tightening a screw for fixing the liquid crystal display module and the lower case through a screw hole located on the upper case, after conducting the final positioning of the liquid crystal display module.

In the invention, the liquid crystal display module positioning projections each including a tapered portion which is formed to be thinner toward the end and a straight portion serving as a base are located on both side portions of the upper case and the liquid crystal display module positioning holes where the positioning projections are inserted are located on both side portions of the liquid crystal display module. As a result, at the time of assembling the liquid crystal display in which the liquid crystal display module is stored in the upper case and lower case, the liquid crystal display module can be placed on the lower case at a position, which is shifted from a predetermined position toward the lower side portion by a distance required for inserting the claw located at the upper side portion of the upper case into the groove of the lower case. After fitting the claw located at the upper side portion of the upper case into the groove on the lower case, the tapered portions at the ends of the liquid crystal display module positioning projections can be brought into contact with the end faces of the liquid crystal display module positioning holes. The liquid crystal display module can be moved toward the predetermined position while pushing up the liquid crystal display module toward the upper side portion through the contact portions. As a result, it becomes possible to easily assemble the liquid crystal display with high accuracy. It is further possible to make the frame narrow and enlarge the screen because an excess space, which has been required in the conventional liquid crystal display, for inserting the claw is no more necessary in the upper side portion.

Furthermore, it is possible to use a metal material such as magnesium alloy of high rigidity for the lower case, and therefore a highly reliable liquid crystal display which is superior in mechanical strength can be obtained.

Other objects, features and advantages of the invention will become apparent in the course of the following description with reference to the accompanying drawings.

BRIEF DESCRIPTION OF THE DRAWINGS

FIG. 3 is a sectional view showing a before-assembly state and an after-assembly state of the liquid crystal display according to Embodiment 1 of the invention.

DESCRIPTION OF THE PREFERRED EMBODIMENT

Embodiment 1

Figure 1:
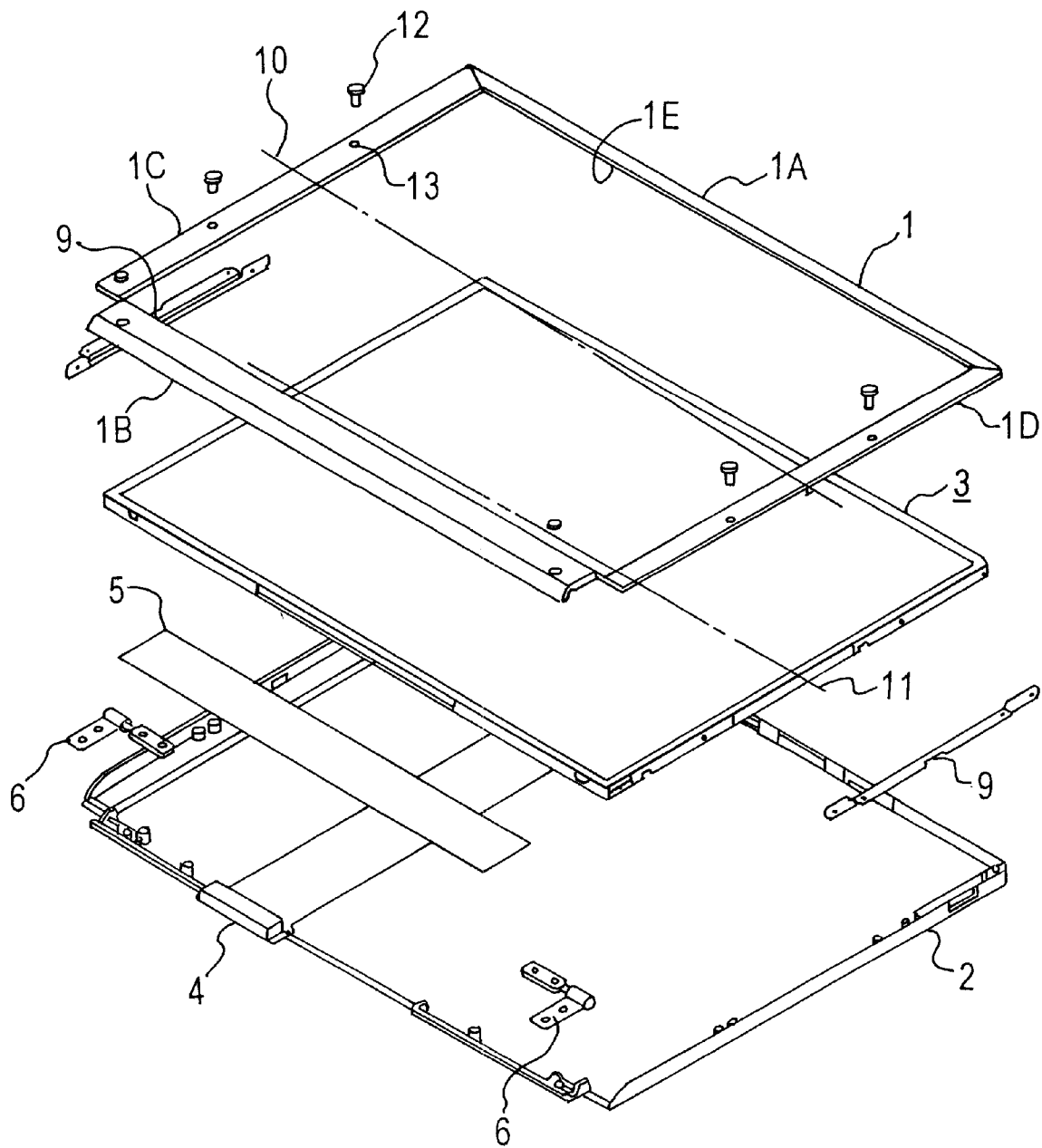
FIG. 1 is an exploded perspective view showing a construction of a liquid crystal display according to Embodiment 1 of the present invention.
Figure 2:
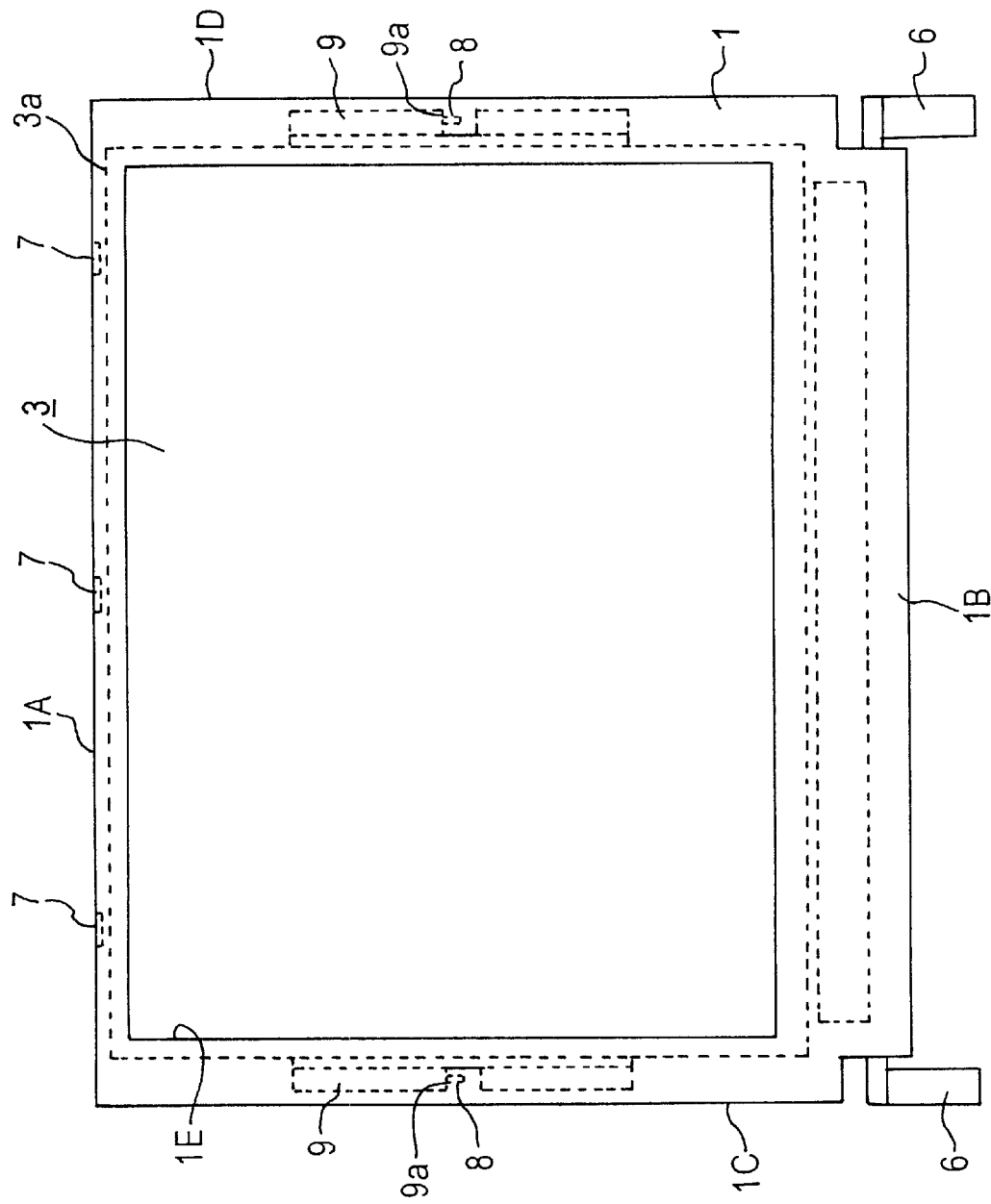
FIG. 2 is a front view showing the construction of the liquid crystal display according to Embodiment 1 of the invention.
Figure 4:
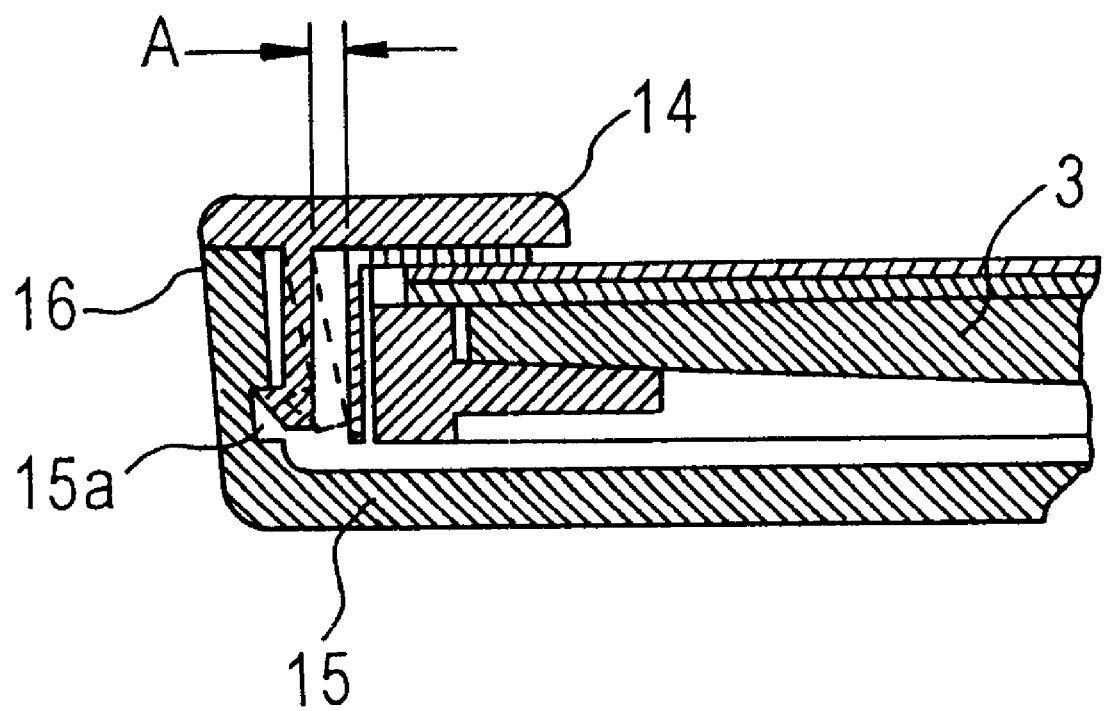
FIG. 4 is a partially sectional view showing an upper side portion of a conventional liquid crystal display.

An embodiment of the invention is hereinafter described with reference to the drawings. FIG. 1 is an exploded perspective view showing a construction of a liquid crystal display for a notebook-type personal computer according to Embodiment 1 of the invention, FIG. 2 is a front view, FIG. 3(a) is a sectional view showing a before-assembly state, and FIG. 3(b) is a sectional view showing an after-assembly state. In the drawings, reference numeral 1 is an upper case shaped into a frame which has an upper side portion 1A and a lower side portion 1B facing each other and a pair of side portions 1C, 1D extending between the upper side portion 1A and lower side portion 1B. A display opening portion 1E is surrounded by these upper side portion 1A, lower side portion 1B, and pair of side portions 1C, 1D. The upper case 1 is formed integrally of a resin material such as polycarbonate, and a claw 7 formed integrally through injection molding or the like is provided on the upper side portion 1A. Numeral 2 is a lower case having a groove 2a in which the claw 7 at the upper side portion of the upper case 1 fits and a liquid crystal display module 3 is stored with the upper case 1. The lower case 2 is made of a metal material such as a magnesium alloy of high rigidity and is formed through die-cast or injection molding. In general, it is not desirable to use screws and the like at the upper side portion of the upper case 1 for design reasons, and therefore at least two claws 7 are provided and are fitted in the grooves 2a of the lower case 2.

In the liquid crystal display module 3, a back light panel (not shown in the drawings) is combined with a liquid crystal display panel including a liquid crystal plate which is integrated with a driving circuit substrate, and the back light panel is composed of a diffusion plate, a light-introducing plate for introducing light, a reflection plate, a linear lamp as a light source, a lamp reflector for concentrating light, and a supporting beam (any of them is not shown in the drawings). In FIG. 2 and FIG. 3, numeral 3a shows an upper side face of the liquid crystal display module 3.

Numeral 4 is a flexible substrate for supplying an electric power necessary for driving the liquid crystal display and a control signal from a main body (not shown in the drawings) composed of an electric controller, numeral 5 is an inverter for driving the liquid crystal display module 3, and numeral 6 is a pair of hinges which are fixed on the lower case 2 and rotatably support the liquid crystal display and the main body. Numeral 8 is a liquid crystal display module positioning projection (hereinafter described as a positioning rib) which is provided on each of the both side portions 1C, 1D of the upper case 1 and includes a tapered portion 8a which is formed to be thinner toward the end and a straight portion 8b serving as a base. In this embodiment, each of the side portions 1C, 1D of the upper case 1 is provided with one positioning rib 8. Each positioning rib 8 is also formed integrally with the upper case 1 through injection molding or the like. Numeral 9 is a liquid crystal display module positioning part which is fixed on each of left and right side portions of the liquid crystal display module 3 and has a positioning hole 9a in which the positioning rib 8 is inserted. Numeral 10 is a longitudinal center of the upper case display opening portion, numeral 11 is a longitudinal center of the liquid crystal display module, numeral 12 is a fixing screw for fixing the liquid crystal display module 3 to the upper case 1 and the lower case 2, and numeral 13 is a screw hole. At least two screw holes are provided on the left and right side portions 1C, 1D of the upper case 1.

Described below is a method for assembling the liquid crystal display according to this embodiment. First, the flexible substrate 4 which is an electrical connecting cable to the main body side is connected to the liquid crystal display panel mounted with a driving circuit which is built in the back light of the liquid crystal display module 3. Then, a lamp cable of the back light is connected to the inverter 5, and the inverter 5 is mounted on the lower case 2. After that, the liquid crystal display module 3 is arranged on the lower case 2 at a position, which is shifted from a predetermined position toward the lower side portion 1B by a distance (B in FIG. 3) required for inserting the claw 7 located at the upper side portion 1A of the upper case 1 into the groove 2a of the lower case 2. Next, the claw 7 located at the upper side portion 1A of the upper case 1 is fitted into the groove 2a on the lower case 2, and the upper case 1 is turned toward the lower case 2 with the claw 7 as the center. The left and right side portions 1C, 1D and the lower side portion 1B of the upper case 1 are fitted with both side portions and a lower side portion of the lower case 2 respectively. At this time, the tapered portions 8a at the ends of the positioning ribs 8 located on the left and right side portions 1C, 1D of the upper case 1 are brought into contact with end faces of the positioning holes 9a of the liquid crystal display module positioning parts 9 fixed and located on left and right side portions of the liquid crystal display module 3, and the liquid crystal display module 3 is moved to a predetermined position while pushing up the liquid crystal display module toward the upper side portion 1A through the contact portions. In other words, the liquid crystal display module 3 is moved toward the direction of the arrow by a distance B in FIG. 3. After that, the positioning ribs 8 are inserted into the positioning holes 9a, and the liquid crystal display module 3 is finally positioned by the straight portions 8b serving as a base of the positioning rib 8. The straight portions 8b of the positioning ribs 8 and the positioning holes 9a are arranged so that the upper case display opening portion longitudinal center 10 may coincide with the longitudinal center 11 of the liquid crystal display module and that a side face 7a of the claw 7 of the upper case 1 may come in contact with the upper side face 3a of the liquid crystal display module 3.

After fitting all sides of the upper case 1 with those of the lower case 2 and positioning finally the liquid crystal display module 3, the fixing screws 12 for fixing the liquid crystal display module 3 and the lower case 2 are inserted through the screw holes 13 provided on the upper case 1, the screws are tightened, thus the assembling is completed.

As described above, in this embodiment, when the upper case 1 is fitted with the lower case 2, the liquid crystal display module 3 is arranged by being moved from a predetermined position to the direction of the lower side portion 1B, whereby the liquid crystal display module 3 comes to a predetermined position after fitting the upper case 1 with the lower case 2, which results in easy assembling of the liquid crystal display. As a result, it is no more necessary to secure an excess space heretofore required in the conventional liquid crystal display at the upper side portion 1A, and consequently it is possible to make the frame of the upper side portion 1A narrow. Further, it is possible to easily assemble the liquid crystal display with high accuracy in which the longitudinal center 10 of the upper case display opening portion and the longitudinal center 11 of the liquid crystal display module are located with less slippage. Furthermore, it is possible to use a metal material such as a magnesium alloy of high rigidity for the lower case 2, and the upper side face 3a of the liquid crystal display module 3 comes in contact with the side face 7a of the claw 7 located at the upper side portion 1A of the upper case 1. Therefore, the upper case 1 tightly fits with the lower case 2 and it is possible to obtain a liquid crystal display reliable against external force such as shock and vibration.

Although the liquid crystal display module positioning parts 9 having the positioning holes 9a are fixed on the left and right side portions of the liquid crystal display module 3 in this embodiment, it is also preferable to directly form the positioning holes 9a on the left and right side portions of the liquid crystal display module 3. In such a modification, number of the parts is reduced. Although the upper case 1 is composed of a resin material and the lower case 2 is composed of a magnesium alloy in this embodiment, it is also preferable that the upper case 1 is composed of a metal material such as magnesium alloy and the lower case 2 is composed of other metal material or a resin material. A narrow frame can be achieved also in such a modification. The same advantage is achieved by arranging the positioning ribs 8 on the left and right side portions of the liquid crystal display module 3 and by arranging the positioning holes 9a, which are the contacting portions with the positioning ribs 8, on the left and right side portions 1C, 1D of the upper case 1. Also in this modification, the positioning ribs 8 can be formed either directly on the liquid crystal display module 3 or on the positioning parts fixed to the liquid crystal display module 3.

It is to be understood that the invention is not limited to the foregoing embodiment and various changes and modifications may be made without departing from the spirit and scope of the invention.

What is claimed is:

1. A liquid crystal display comprising:

a liquid crystal display module in which a back light panel is combined with a liquid crystal display panel including a liquid crystal plate which is one with a driving circuit substrate;

an upper case which has an upper side portion and a lower side portion facing each other and a pair of side portions provided between the upper and lower side portions, and forms a display opening portion with the upper side portion, lower side portion, and pair of side portions;

a claw provided on the upper side portion of said upper case;

a lower case which has a groove in which said claw fits and stores said liquid crystal display module with said upper case; and liquid crystal display module positioning projections each being provided on each of two side portions of said upper case and including a tapered portion which is formed to be thinner toward the end and a straight portion serving as a base portion; and wherein both side portions of said liquid crystal display module are provided with liquid crystal display module positioning holes where said positioning projections are inserted.

2. The liquid crystal display according to claim 1, wherein the liquid crystal display module positioning holes are directly formed on both side portions of said liquid crystal display module.

3. The liquid crystal display according to claim 1, wherein the liquid crystal display module positioning holes are formed on positioning parts fixed to the liquid crystal display module.

4. The liquid crystal display according to claim 1, wherein the lower case is made of a metal material of high rigidity.

5. The liquid crystal display according to claim 4, wherein said metal material includes magnesium alloy.

6. The liquid crystal display of claim 1, wherein said liquid crystal display is configured such that said liquid crystal display module moves as said positioning projections are inserted into said positioning holes.

7. The liquid crystal display according to claim 1, wherein one of said upper case and lower case is made of metal material and the other one of said upper case and lower case is made of resin material.

8. The liquid crystal display of claim 1, wherein said liquid crystal display is configured such that said upper case rotates about a pivot as said positioning projections are inserted into said positioning holes.

9. A liquid crystal display comprising:

a liquid crystal display module in which a back light panel is combined with a liquid crystal display panel including a liquid crystal plate which is one with a driving circuit substrate;

an upper case which has an upper side portion and a lower side portion facing each other and a pair of side portions provided between the upper and lower side portions, and forms a display opening portion with the upper side portion, lower side portion, and pair of side portions;

a claw provided on the upper side portion of the upper case;

a lower case which has a groove in which the claw fits and stores the liquid crystal display module with the upper case; and liquid crystal display module positioning projections each being provided on each of two side portions of the liquid crystal display module and including a tapered portion which is formed to be thinner toward the end and a straight portion serving as a base portion; and wherein both side portions of the upper case are provided with liquid crystal display module positioning holes in which said positioning projections are inserted.

10. The liquid crystal display according to claim 9, wherein the liquid crystal display module positioning projections are directly formed on both side portions of said liquid crystal display module.

11. The liquid crystal display of claim 9, wherein said liquid crystal display is configured such that said liquid crystal display module moves as said positioning projections are inserted into said positioning holes.

12. The liquid crystal display according to claim 9, wherein one of said upper case and lower case is made of metal material and the other one of said upper case and lower case is made of resin material.

13. The liquid crystal display according to claim 9, wherein the liquid crystal display module positioning projections are formed on positioning parts fixed to said liquid crystal display module.

14. A method for assembling a liquid crystal display comprising a liquid crystal display module in which a back light panel is combined with a liquid crystal display panel including a liquid crystal plate integrated with a driving circuit substrate, an upper case which has an upper side portion and a lower side portion facing each other and a pair of side portions located between the upper and lower side portions and forms a display opening portion with the upper side portion, lower side portion, and pair of side portions, a claw located on the upper side portion of the upper case, and a lower case which has a groove in which the claw fits, and in which said liquid crystal display module is stored in said upper case and lower case, the method including the steps of:

placing said liquid crystal display module on said lower case at a position, which is shifted from a predetermined position toward the lower side portion by a distance required for inserting the claw located at the upper side portion of said upper case into the groove of said lower case;

fitting the claw located at the upper side portion of said upper case into the groove on said lower case;

turning said upper case toward said lower case with said claw as a center;

fitting both side portions and the lower side portion of said upper case with those of said lower case;

bringing tapered portions located at the ends of liquid crystal display module positioning projections provided on both side portions of said upper case into contact with end faces of liquid crystal display module positioning holes provided on both side portions of the liquid crystal display module;

moving said liquid crystal display module toward a predetermined position while pushing up said liquid crystal display module toward the upper side portion through the contact portions;

inserting the positioning projections into said positioning holes; and conducting a final positioning of said liquid crystal display module making use of straight portions serving as a base of the positioning projections.

15. The method for assembling a liquid crystal display according to claim 14, wherein the method includes a step of tightening a screw for fixing said liquid crystal display module and said lower case through a screw hole located on the upper case, after conducting the final positioning of the liquid crystal display module.

* * * * *